Inventor:
Charles F. O'Neill
By Hofgren, Wegner,
Allen, Stellman & McCord
Attys

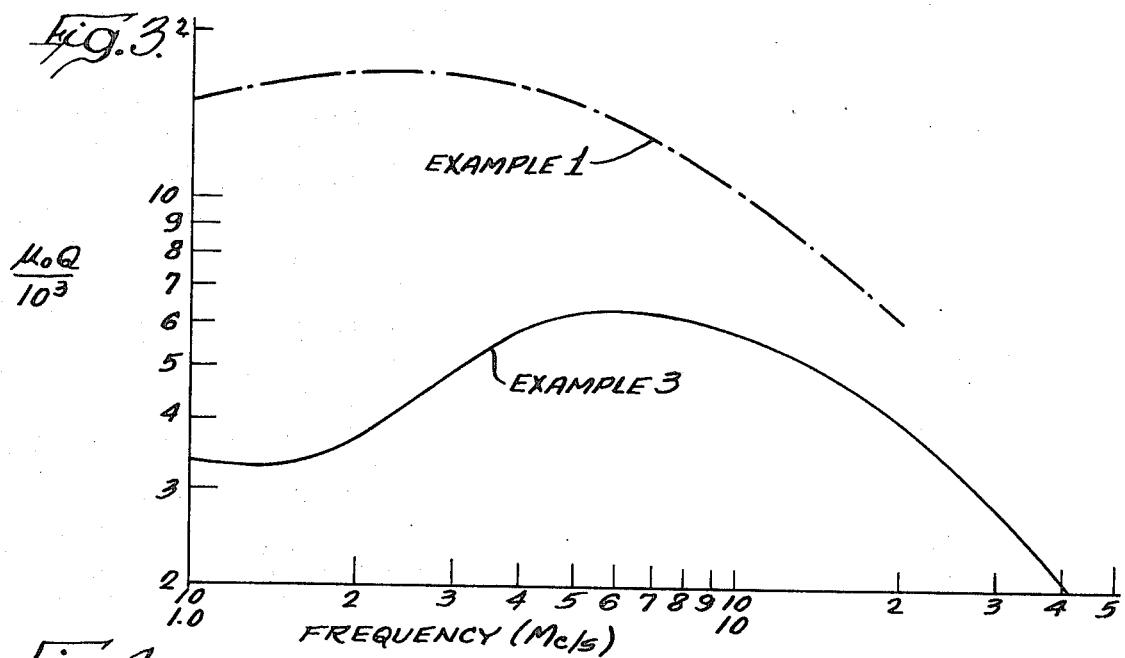
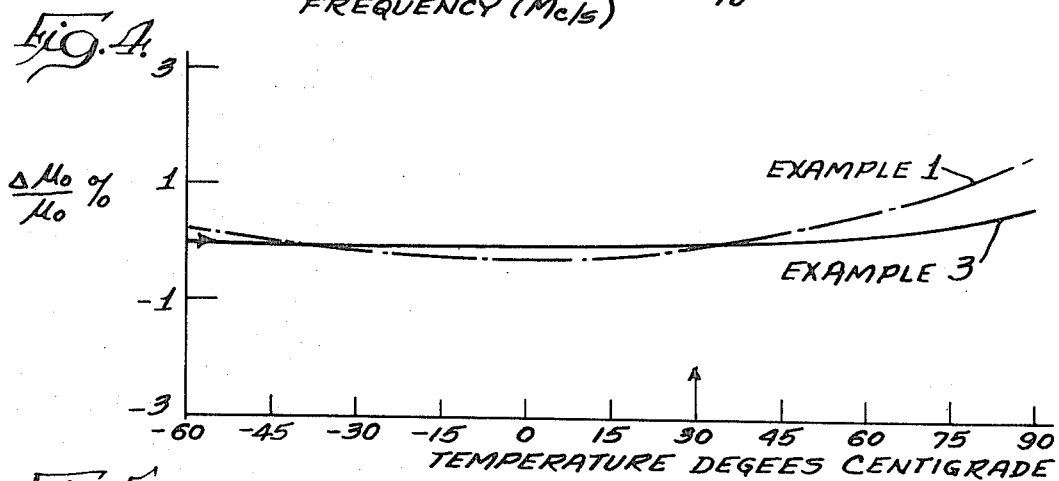
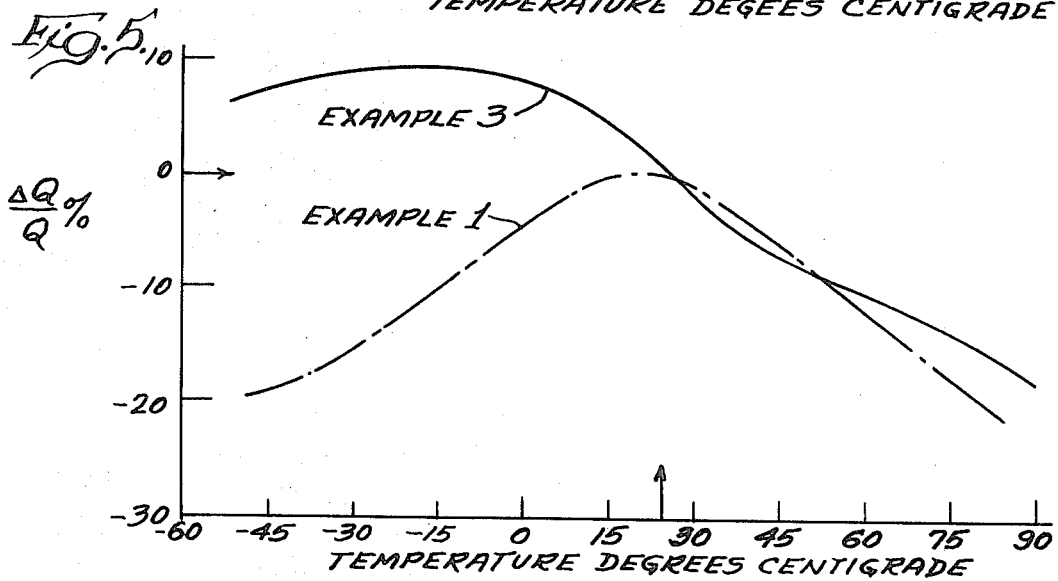

3,532,629
NICKEL-ZINC FERRITE CONTAINING
SILICA AND THORIUM
Charles F. O'Neill, Milltown, N.J., assignor, by mesne
assignments, to Electronic Memories & Magnetics Corporation, Hawthorne, Calif., a corporation of Delaware
Filed Aug. 25, 1967, Ser. N. 663,429
Int. Cl. C04b *35/30*
U.S. Cl. 252—62.57                                                5 Claims

ABSTRACT OF THE DISCLOSURE

A stable nickel-zinc ferrite body densified with inorganic silicate and containing thorium. The ferrite body has sintered particles including $Fe_2O_3$, NiO and ZnO in a mol ratio of, e.g., 50:30:20 and inorganic silicate, e.g., lead silicate, bentonite or the like, in an amount of about 1-15 weight percent (based on total iron, nickel and zinc oxide) and a minor amount, e.g., about 5-7 mol percent of thorium oxide. The ferrite body is useful in R.F. applications.

Background of the invention

This invention is related to the invention of R. Tenzer disclosed in a co-pending application entitled, "Nickel Zinc Ferrite Containing Silicate", Ser. No. 659,779, filed Aug. 10, 1967, in that the invention described herein is an improvement in such ferrites.

Field of the invention

This invention relates to improvements in stabilized soft nickel-zinc ferrite and especially those ferrites which are stabilized by densification with inorganic silicate.

Explanation of symbols

Properties of ferrites are conventionally identified by the art of symbols, and the following list identifies and explains the meaning of symbols used in the present application.

Meaning of symbols

Symbols:
 $\mu_o$—Initial permeability
 Q—Quality factor, ratio of reactance to resistance for a coil containing the ferrite
 TF—The temperature coefficient divided by the effective permeability, i.e.

$$TF = \frac{\Delta \mu_0}{\mu_0 \Delta T} \text{ (p.p.m./}^\circ \text{C.)}$$

Description of the prior art

The above identified Tenzer application discloses nickel-zinc ferrites which have been densified by addition of inorganic silicate for the purpose of improving stability of certain characteristics over a wide temperature range. The Tenzer application discloses the addition of a minor amount, e.g., 1-15 weight percent, of inorganic silicate to known nickel-zinc ferrite compositions can improve temperature stability of permeability, disaccommodation, influence of D.C. fields and A.C. sensitivity properties of the ferrite.

Nickel-zinc ferrites are well known to those in the art and conventionally contain ferric oxide, nickel oxide and zinc oxide in mol ratios of about 50:30:20. In the practical preparation of these ferrites, they can be formed as iron deficient or iron rich and can also be deficient or rich in nickel and/or zinc. Accordingly, the ferrites usually contain between 40 and 60 mol percent ferric oxide and 40-60 mol percent total nickel and zinc, with the nickel and zinc oxides being present in a mol ratio of from about 0.5:1 to about 3:1 nickel oxide:zinc oxide. The ferrites are conventionally produced by calcining and mixing the metal oxides as powders in the appropriate mol ratios, slurrying the mixed powder in water, drying and screening the slurry to provide a soft powder which is then mixed with an organic binder such as polyvinyl alcohol and the resulting mass is pressed or otherwise formed to the desired shape and then fired to sinter the oxides. In preparing the Tenzer ferrites which contain silicate addition, the silicate can be added to the raw mix prior to calcining or to the slurry after calcining, but preferably to the raw mix.

In studying the Tenzer nickel zinc ferrite with silicate addition, it has been found that although the silicate addition provides stable permeability over a wide temperature range, the silicate addition also lowers the Q value and/or $\mu_o$. For example, where bentonite is used as the silicate a good temperature stability of $\mu_o$ can be obtained which varies from linearity only by plus or minus 0.2% between $-50°$ C. and $+85°$ C., but $\mu_o$ and Q are both lowered. When lead silicate is used as the silicate, Q is improved, but $\mu_o$ is lowered even more than in the case of bentonite.

SUMMARY OF THE INVENTION

This invention is an improvement in the nickel-zinc ferrites with silicate addition described in the Tenzer application, and the Tenzer application is relied on herein as a disclosure of those ferrites. According to the improvement of the present invention, the nickel-zinc ferrites with silicate addition are further modified by the inclusion of thorium for the purpose of improving the level of Q while providing good linearity of $\mu_o$. The addition of thorium to the nickel-zinc ferrite shifts the frequency curve of Q more clearly into the range of 1-12 mc./s., a desirable range for operation in radio frequency applications. Thus, in accordance with this invention, thorium is added to the ferrite in an amount sufficient to improve Q and shift the frequency curve of Q toward the range of 1-12 mc./s.

BRIEF DESCRIPTION OF THE DRAWINGS

FIG. 3 is a plot of the product of $\mu_o$ and Q for other examples of this invention;

FIG. 4 is a plot of the percent change of $\mu_o$ against temperature for the two compositions of this invention referred to in the above description of FIG. 3; and FIG. 5 is a plot showing the percent change in Q against temperature for these two examples.

Figure 1:
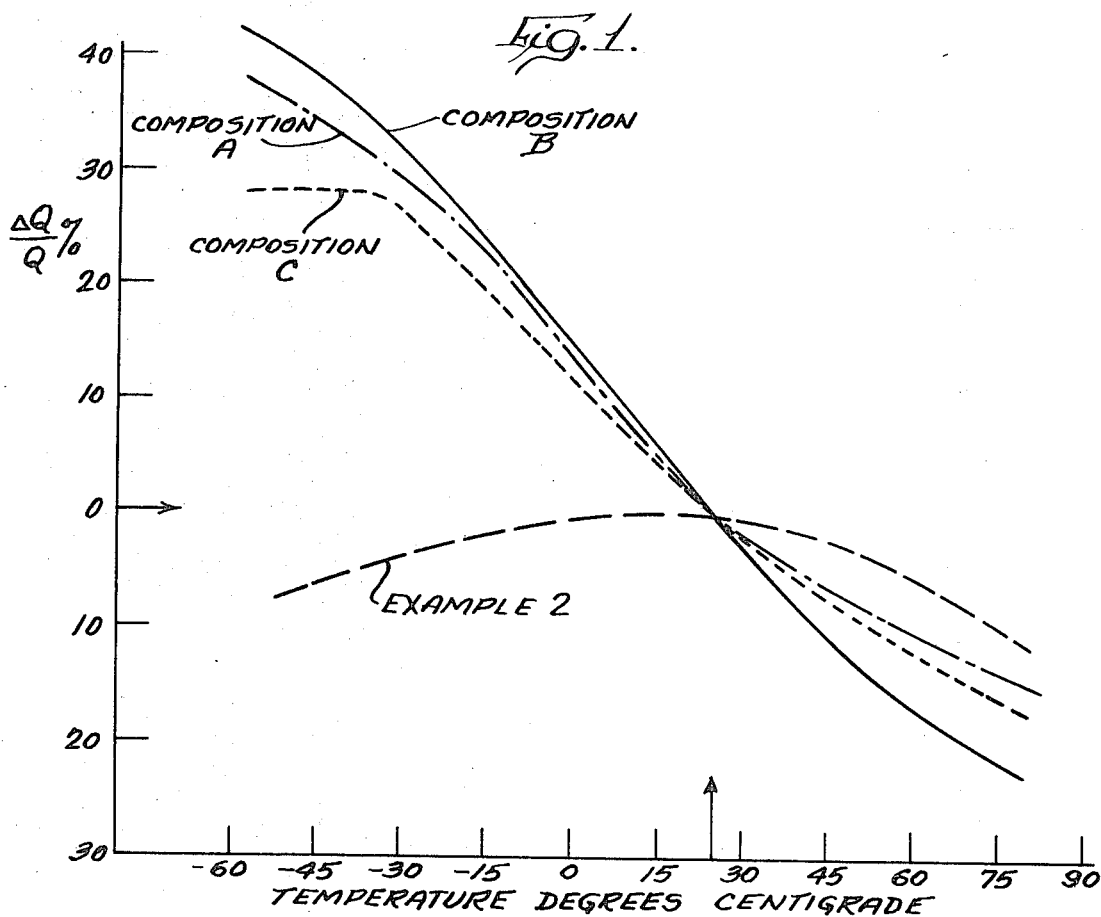
FIG. 1 is a plot of the percent change in Q against temperature and showing a comparison between an example of this invention and three Tenzer compositions.

DESCRIPTION OF THE PREFERRED
EMBODIMENTS

The complete disclosure of the above identified Tenzer application is hereby incorporated herein by reference. The present invention is an improvement on the Tenzer discovery, and the preferred features in Tenzer including, but not limited to, amounts of ingredients and the like, are also preferred in the present invention unless otherwise stated.

According to the present invention a minor amount, i.e., less than 50 mol percent, of thorium oxide is provided in the sintered nickel-zinc ferrite having silicate addition. For example, up to 15 mol percent thorium oxide, such as .1–15 mol percent, and preferably from 2–10 mol percent thorium oxide can be included as an addition in the ferrite. In the enumerated examples given below, from 5 to 7 mol percent thorium oxide was used, and this was found to be an advantageous range for providing the improved Q value properties.

The thorium oxide is provided in the composition by adding to the ferrite composition prior to sintering a thorium salt or other throium compound which is convertible to thorium oxide at sintering temperature. The thorium compound can be mixed with the original metal oxide ingredients or added to the slurry of calcined ingredients, but preferably to the slurry after calcining.

In a typical example of the manufacture of a nickel-zinc ferrite having silicate and thorium addition, ferric oxide, nickel oxide and zinc oxide powders are mixed in appropriate mol ratios as desired. Bentonite, kaolin, silica, lead silicate, lithium silicate or other silicate is added to the raw mix in the desired amount, usually between 1 and 15 weight percent based on total iron, nickel and zinc oxide. After calcining this mix, the desired amount of thorium compound is added to the slurry in the ball milling step. Thorium can be added as a water soluble salt of thorium, e.g., thorium bromide, chloride, nitrate or sulfate, which is converted to the oxide during later sintering. Of these the thorium nitrate is the preferred salt. After thorough mixing of the slurry, the slurry is dried and screened to provide a soft powder.

An organic binder, e.g. polyvinyl alcohol, is then added, e.g., as a 10% solution in water, and is mixed with the powder to form a soft moist powder. The moisture content of the powder can vary somewhat, but the presence of some moisture is beneficial in that it has a lubricating effect and allows the particles to be pressed closer together with less pressure. The powder is then pressed to the desired shape, e.g., the shape of a toroid, while it is still in moist condition, and is then fired until sintered, e.g., at about 1200° C. or higher. Preferably, the nickel oxide used is a high purity oxide prepared by calcining nickel formate so that the nickel oxide will contain no more than only the very small amounts of cobalt oxide, e.g., less than the 0.1 weight percent cobalt oxide which normally occurs in commercial nickel oxide. The preferred compositions in accordance with the present invention are substantially cobalt free.

The following examples are offered by way of illustration of the present invention and are not intended as limitations on the inventions.

The examples refer to Examples 10 and 15–17 of the above Tenzer application, which Tenzer examples are as follows:

Tenzer Example 10

A nickel-zinc ferrite was prepared by calcining a mixture of ferric oxide, zinc oxide, nickel oxide and bentonite powders at about 1200° C. The nickel oxide used was a high purity oxide prepared by calcining nickel formate. The high purity nickel oxide contained only 0.1 weight percent or less of cobalt oxide and was a fine powder which was much more reactive than commercial nickel oxide. The calcined material was slurried, ball-milled, dried and screened, providing a soft powder. An organic binder, e.g., polyvinyl alcohol, was added as a 10% solution in water and mixed quickly and gently with the powder forming a soft moist powder. The moisture content can vary but presence of some moisture is beneficial. The powder was pressed to desired toroid form while it was in the moist condition and was then fired until sintered, e.g., at about 1200° C. The pressed and sintered material contained ferric oxide, nickel oxide, and zinc oxide in mol percent ratios of 48.9:30.9:20.2 and also contained 10.25 percent by weight bentonite based on said three oxides.

Tenzer Examples 15–17

The procedure of Example 10 was repeated substituting various amounts of lead silicate for the bentonite used therein. The amounts of lead silicate provided the lead oxide content for each example as reported in the following table. The iron, nickel and zinc oxide contents are also reported:

| | $Fe_2O_3$, Mol percent | NiO, Mol percent | ZnO, Mol percent | PbO, Mol percent |
|---|---|---|---|---|
| Tenzer example No.: | | | | |
| 15 | 44.99 | 28.03 | 18.70 | 2.05 |
| 16 | 44.70 | 28.66 | 19.24 | 2.20 |
| 17 | 42.58 | 27.58 | 18.64 | 3.41 |

The lead silicate was a very effective fluxing agent permitting better sintering at lower temperatures due to its much lower melting point. In each of these three examples a ratio of PbO to $SiO_2$ which is near the bisilicate ratio was used since prior studies indicated that such a mix gave better magnetic properties.

EXAMPLE 1

The procedure of Tenzer Example 10 was carried out except that about 38% by weight thorium nitrate was added to the slurry and sintering of the pressed toroid was at 1370° C. for 30 minutes in air. The chemical composition of a typical ferrite prepared by this example is given as mol percentages in Table I below.

EXAMPLE 2

The procedure of Tenzer Example 16 was carried out except that additional iron oxide and about 38 weight percent thorium nitrate were added to the slurry and the toroids were sintered or fired at about 1190° C. for 15 minutes in air. The chemical composition of a typical ferrite prepared by this Example is given as mol percentages in Table 1 below.

EXAMPLE 3

Example 1 above was repeated with less iron oxide and more nickel oxide in the original mix to prepare a high nickel content iron deficient ferrite. The toroids were fired at about 1260° C. for 15 minutes in air. The chemical composition of a typical ferrite prepared by this example is given as mol percentages in Table 1 below.

For purpose of comparison with the ferrites of this invention, various of the ferrites described in the Tenzer application were used. These were Examples 15, 16 and 17 of Tenzer, and they are referred to herein as Compositions A, B and C, respectively. The chemical composition of these is also given as mol percentages in Table 1.

TABLE 1

| | MF- | $Fe_2O_3$ | NiO | ZnO | $SiO_2$ | $Al_2O_3$ | PbO | MgO | CaO | $ThO_2$ |
|---|---|---|---|---|---|---|---|---|---|---|
| Comp. A | 9,622 | 44.99 | 28.03 | 18.70 | 6.22 | | 2.05 | | | |
| Comp. B | 9,632 | 44.70 | 28.66 | 19.24 | 5.20 | | 2.20 | | | |
| Comp. C | 9,633 | 42.58 | 27.58 | 18.64 | 7.75 | | 3.41 | | | |
| Ex. 1 | 9,055 | 44.75 | 21.65 | 14.75 | 8.98 | 2.21 | | .59 | .19 | 6.88 |
| Ex. 2 | 9,060 | 48.31 | 23.35 | 15.67 | 5.71 | | 1.79 | | | 5.16 |
| Ex. 3 | 9,061 | ¹36.65 (L) | 32.50 | 13.46 | 8.44 | 1.85 | | .73 | .25 | 6.22 |

¹ Iron oxide content in raw mix; before milling for 42 hours in vibration mill.

Figure 2:
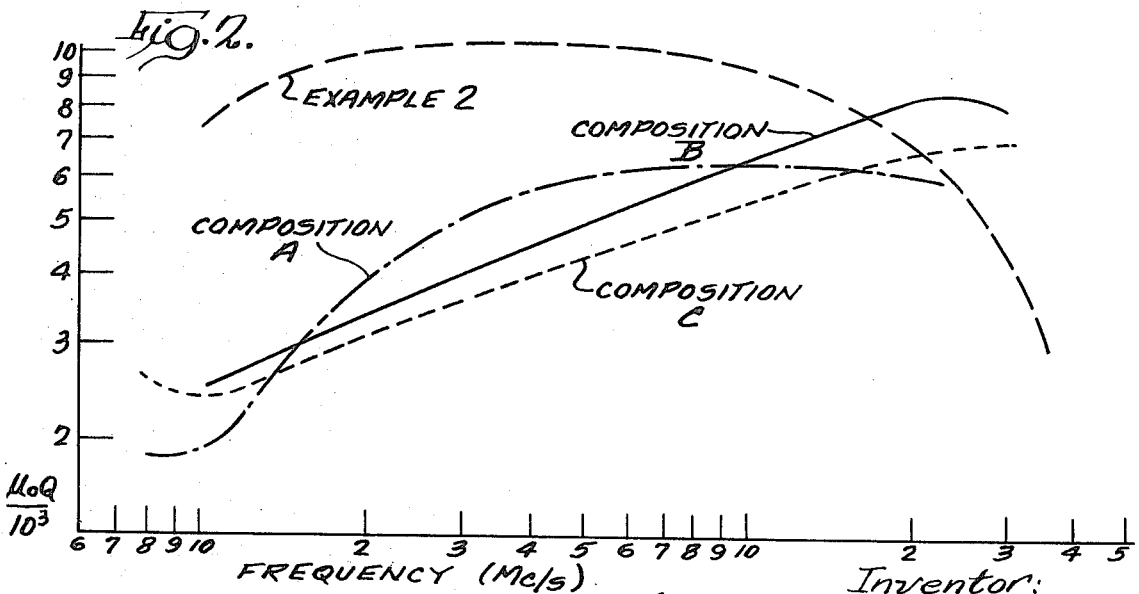
FIG. 2 is a plot of the product of $\mu_o$ and Q against frequency showing a comparison between an example of this invention and three Tenzer compositions.

Referring now to the drawings, it is seen that the Q value for Composition C, which is an iron deficient ferrite, shows a more or less linear increase of about 45% as temperature drops from 85° to −50° C. (see FIG. 1). In comparison, the composition of Example 2 is based on Composition B except that additional iron oxide and thorium nitrate were added to the slurry during manufacture. Comparing the plot of Example 2 with the plots of Compositions A, B and C in FIG. 1, it will be noted that addition of thorium has markedly reduced the large variation of Q and, with reference to FIG. 2, has also provided an improved low frequency response of Q with temperature was about 11%. The temperature behavior of $\mu_o$ was also plotted for Example 2 and was found to be linear within 0.1%.

The material of Example 1 includes bentonite as the silicate and it was found that the addition of thorium nitrate in this composition resulted in very high Q values and $\mu_o Q$ values which were in excess of 10,000 throughout the frequency range of 1–12 mc./s. as illustrated in FIG. 3. The total temperature change of Q was 20%, and the TF was about 1.5 p.p.m./° C. The temperature curves of percent change in $\mu_o$ and Q are shown respectively in FIGS. 4 and 5.

The material of Example 3 contains 10% addition of bentonite and also thorium nitrate addition and additional nickel to provide a nickel oxide:zinc oxide mol ratio of about 2.5:1. FIGS. 3 through 5 show the $\mu_o Q$ vs. frequency, $\mu_o$ vs. temperature and Q vs. temperature for the Example 3 material. As seen in FIG. 4, the increase in nickel content further flattened the temperature curve of $\mu_o$. It was found that increasing the nickel content also lowered $\mu_o$ but because lower nickel content bodies had more than enough $\mu_o$ for practical application, the advantages of further temperature stability were worth the sacrifice of a certain amount of $\mu_o$. The increased nickel content also tended to increase the frequency range of the material as seen in FIG. 3.

Cup cores were also provided in the manner disclosed by Tenzer, i.e., by casting sheets of ferrite material and machining the desired cup core sizes therefrom. The cup cores were tested, and it was found that the properties discovered in the toroid forms were also available in the cup core shape.

Further comparison of Compositions A, B and C with Example 2 showed that Example 2 is improved not only in the stability of Q with temperature, but also in increased $\mu_o Q$ at frequencies below 5 mc./s. and in lower TF values. For example, the Composition B had a TF value of 7.4 p.p.m./° C. while the TF value of Example 2 was 1.7 p.p.m./° C. The properties of this material show it to be useful for the purpose of providing a device with an essentially temperature independent inductance.

The ferrites of the present invention have a fine homogeneous grain structure, with grain size of about 1 micron or less and a density in the neighborhood of 90% theoretical. These properties appear to contribute toward high Q values and good initial permeabilities in addition to low TF values. Preferably, the total ferric iron content should be near stoichiometric or in slight excess in relation to the nickel and zinc content. Deficiency of iron apparently results in higher TF values of $\mu_o$ or nonlinear temperature curves. Preferably, the material also contains less than 0.5 weight percent divalent iron based on total iron to assure against temperature instability of Q.

The ferrites contain sufficient amounts of silicate addition as disclosed by Tenzer to result in flat or nearly flat temperature curves of $\mu_o$. The silicate apparently forms a second phase with some of the other ingredients in the ferrite, and the second phase functions as a matrix in which the fine grains of the basic ferrite are embedded as a crystallite phase. The thorium salt, e.g. nitrate, appears to function as a grain growth inhibitor and also ties up oxygen in the structure resulting in formation of less divalent iron. The presence of thorium usually requires higher sintering temperatures than the lower temperatures which are possible with silicate addition alone.

I claim:

1. In a soft ceramic nickel-zinc ferrite of sintered particles which has a composition of between 40 and 60 mol percent ferric oxide, between 40 and 60 mol percent total nickel and zinc oxides, said nickel and zinc oxides being present in a mol ratio between about 0.5:1 and about 3:1 nickel oxide:zinc oxide and which includes between about 1 and about 15 weight percent of inorganic silicate addition, the improvement comprising:

an amount of from 0.1 to 15 mol percent of thorium oxide in said ferrite, based on total mols of nickel, zinc and iron oxides, said thorium oxide being present in an amount sufficient to increase the $\mu_o Q$ product and to improve the temperature dependence of Q.

2. The nickel-zinc ferrite of claim 1 wherein said amount of thorium oxide is 5 to 7 mol percent.

3. The nickel-zinc ferrite of claim 1 wherein the ferric oxide content relative to the nickel zinc content is present in at least the stoichiometric amount.

4. The nickel-zinc ferrite of claim 1 wherein the divalent iron content is less than 0.5 weight percent based on total ferrite.

5. The nickel-zinc ferrite of claim 1 containing less than 0.1 percent cobalt based on nickel content.

References Cited

UNITED STATES PATENTS 3,106,534   10/1963   Akashi et al. _____ 252—62.62

TOBIAS E. LEVOW, Primary Examiner

R. D. EDMONDS, Assistant Examiner

U.S. Cl. X.R.

252—62.59, 62.62, 301.1